(12) United States Patent
Suda et al.

(10) Patent No.: US 8,816,569 B2
(45) Date of Patent: Aug. 26, 2014

(54) ACTUATOR

(75) Inventors: Sakae Suda, Yokohama (JP); Sotomitsu Ikeda, Yokohama (JP); Tetsuo Hino, Yamato (JP); Jun Yamamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 35 days.

(21) Appl. No.: 13/514,006

(22) PCT Filed: Nov. 26, 2010

(86) PCT No.: PCT/JP2010/071749
§ 371 (c)(1),
(2), (4) Date: Jun. 5, 2012

(87) PCT Pub. No.: WO2011/070986
PCT Pub. Date: Jun. 16, 2011

(65) Prior Publication Data
US 2012/0235543 A1    Sep. 20, 2012

(30) Foreign Application Priority Data
Dec. 8, 2009    (JP) .................................. 2009-278961

(51) Int. Cl.
*H02N 11/00*    (2006.01)

(52) U.S. Cl.
USPC ............................. 310/328; 310/300; 310/800

(58) Field of Classification Search
USPC ......... 310/311, 300, 363, 365, 366, 308, 330, 310/800, 328, 367, 332, 346
IPC ........................ H01L 41/08; H02N 11/00,11/02
See application file for complete search history.

(56) References Cited

U.S. PATENT DOCUMENTS

| | | | | |
|---|---|---|---|---|
| 5,268,082 A * | 12/1993 | Oguro et al. | ................... | 310/800 |
| 7,335,317 B2 * | 2/2008 | Hong et al. | ................. | 252/62.54 |
| 7,583,009 B2 * | 9/2009 | Nagai et al. | ................... | 310/328 |
| 8,004,146 B2 * | 8/2011 | Asaka et al. | ................... | 310/300 |
| 8,123,983 B2 * | 2/2012 | Komatsu et al. | ............... | 252/500 |
| 8,143,764 B2 * | 3/2012 | Nagamitsu et al. | ............ | 310/800 |
| 8,330,322 B2 * | 12/2012 | Suda | ............................. | 310/300 |
| 8,456,058 B2 * | 6/2013 | Suda et al. | ..................... | 310/300 |
| 8,487,505 B2 * | 7/2013 | Ikushima et al. | ............. | 310/300 |
| 8,558,434 B2 * | 10/2013 | Suda et al. | ..................... | 310/363 |
| 2011/0227455 A1* | 9/2011 | Nagamitsu et al. | ........... | 310/333 |

FOREIGN PATENT DOCUMENTS

| | | |
|---|---|---|
| JP | 2005-176428 A | 6/2005 |
| JP | 2007-244103 A | 9/2007 |
| JP | 2008-148452 A | 6/2008 |
| JP | 2009-112100 A | 5/2009 |
| JP | 2009-278787 A | 11/2009 |

* cited by examiner

*Primary Examiner* — Jaydi San Martin
*Assistant Examiner* — Karen B Addison
(74) *Attorney, Agent, or Firm* — Canon U.S.A., Inc., IP Division

(57) ABSTRACT

There is provided an actuator that can deform as an electrolyte moves, wherein at least one of a pair of electrode layers contains polymer fibers, and the polymer fibers contain an electroconductive material and are porous.

8 Claims, 2 Drawing Sheets

ACTUATOR

TECHNICAL FIELD

The present invention relates to an actuator that includes a pair of electrodes and an electrolyte between the pair of electrodes.

BACKGROUND ART

Actuators are being developed in the fields of industrial, medical, and personal robots and micromachines.

PTL 1 discloses an actuator that includes a pair of electrode layers and an ion electrode layer between the pair of electrode layers. The electrode layers contain carbon nanotube. The ion electrode layer contains an ionic liquid.

CITATION LIST

Patent Literature

PTL 1 Japanese Patent Laid-Open No. 2005-176428

SUMMARY OF INVENTION

Solution to Problem

It is difficult for the actuator described in PTL 1 to achieve large displacement. The present invention provides an actuator that can achieve large displacement.

The present invention provides an actuator that includes a pair of electrode layers and an electrolyte layer between the pair of electrode layers, the electrolyte layer containing an electrolyte, wherein the application of a voltage to the pair of electrode layers deforms the actuator, at least one of the pair of electrode layers contains polymer fibers, and the polymer fibers contain an electroconductive material and are porous.

DESCRIPTION OF EMBODIMENTS

Figure 1A:
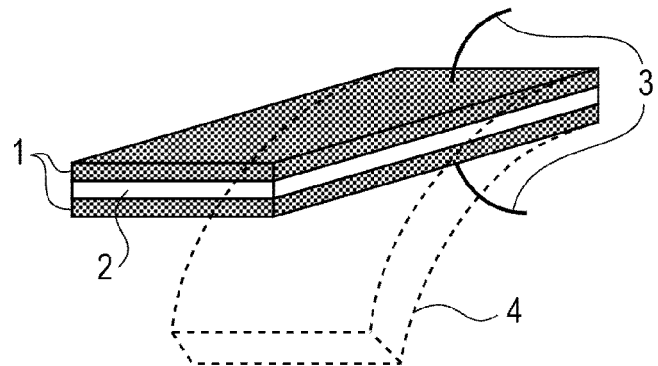
FIG. 1A is a schematic view of an actuator according to one embodiment of the present invention.

Embodiments of the present invention will be described in detail below.

An actuator according to one embodiment of the present invention includes a pair of electrode layers and an electrolyte layer between the pair of electrode layers. The electrolyte layer contains an electrolyte. At least one of the electrode layers contains polymer fibers. The polymer fibers contain an electroconductive material and are porous.

In the present embodiment, the electrode layer contains polymer fibers, which contain an electroconductive material. There are voids among the polymer fibers. The voids facilitate the movement and/or diffusion of ions. In addition, each of the polymer fibers is porous. This facilitates the entry and exit of the electrolyte in the polymer fiber. Thus, the actuator can exhibit large displacement. An actuator according to one embodiment of the present invention will be described below with reference to the drawings, wherein reference numeral 1 denotes electrode layers, 2 denotes an electrolyte layer, 3 denotes lead wires, 4 denotes a curved actuator, 5 denotes polymer fibers, 6 denotes voids among the polymer fibers, 7 denotes a polymer fiber, 8 denotes a pore in the polymer fiber, and 9 denotes an electroconductive material.

FIG. 1A is a schematic view of an actuator according to the present embodiment. The actuator includes a pair of electrode layers 1, an electrolyte layer 2, and lead wires 3. The electrode layers 1 are a pair of electrodes facing each other. The electrolyte layer 2 is disposed between the electrode layers 1. In the actuator, the electrode layers 1 and the electrolyte layer 2 are layered. The deformation of the electrode layers results in the deformation of the actuator. The lead wires 3 provide an electric potential between the electrode layers 1 and are connected to ends of the long electrodes. The application of an electric potential between the pair of electrode layers 1 moves an electrolyte in the electrolyte layer to an anode or a cathode. This increases the volume of one of the electrode layers, thereby deforming the actuator as indicated by the dotted line 4 in FIG. 1A. The actuator is curved while one end of the actuator to which the lead wires 3 are connected is fixed.

The application of an electric potential alters the volume of one electrode of the electrode layers 1. The electrolyte from the electrolyte layer 2 alters the volume of the electrode layer. When the volume of the electrode layer increases, one side of the electrode in contact with the electrolyte layer is smaller in area than the other side of the electrode away from the electrolyte layer.

Figure 1B:
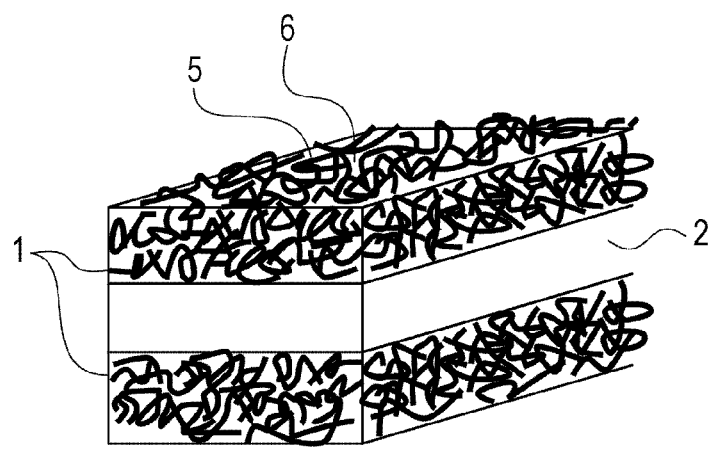
FIG. 1B is a schematic view of the electrode layers 1 and the electrolyte layer 2 of the actuator illustrated in FIG. 1A.

FIG. 1B is a schematic view of the electrode layers 1 and the electrolyte layer 2 of the actuator illustrated in FIG. 1A.

The electrode layers 1 contain polymer fibers 5 and voids 6. The electrode layers 1 are aggregates of the polymer fibers 5. The polymer fibers 5 in the present embodiment have a random shape. There are the voids 6 among the polymer fibers 5.

Figure 1C:
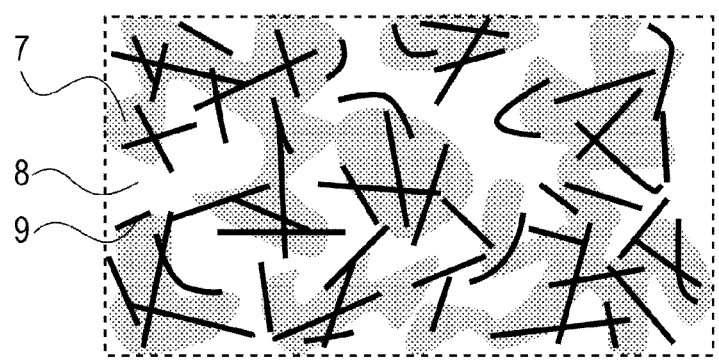
FIG. 1C is an enlarged schematic view of polymer fibers constituting the electrode layers 1 of the actuator illustrated in FIG. 1A.

FIG. 1C is an enlarged schematic view of the polymer fibers constituting the electrode layers 1 of the actuator illustrated in FIG. 1A. A polymer fiber 7 contains a pore 8 and an electroconductive material 9. The polymer fiber 7 is insulative. The polymer fiber 7 contains the electroconductive material 9 on the surface of or inside the polymer fiber 7. The polymer fiber 7 is porous. The electroconductive material 9 is exposed on the surface of the polymer fiber 7 and the surface of the pore 8.

The electrolyte layer 2 contains an electrolyte. An electric field applied to the pair of electrode layers 1 moves the electrolyte toward one of the electrodes. The electrolyte may be ionized in the electrolyte layer 2 in the absence of electric potential. The application of an electric field may ionize and move the electrolyte to one of the electrodes.

The electrolyte moves to one of the electrode layers 1 in the presence of an electric potential. The electrolyte enters the voids 6 among the polymer fibers of the electrode layer. The electrode layer contains a large number of voids among the polymer fibers. Thus, the electrolyte can easily enter and exit from the electrode layer. Furthermore, since the polymer fibers are porous and have a large surface area, the electrolyte can easily enter and exit from the polymer fibers.

The movement of the electrolyte to the electrode layers is partly due to the electroconductive material in the polymer fibers.

The electrode layers according to the present embodiment contain at least one type of polymer fiber. The polymer fibers according to the present embodiment have a sufficient length relative to the diameter. The fiber diameter ranges from 0.05 to 50 µm, and the fiber length is at least 10 times the fiber diameter.

Pores of the porous polymer fibers include closed cells and open cells. Open cells can facilitate the movement and diffusion of cations and anions. The polymer fibers may contain both closed cells and open cells.

The polymer fibers can have a porosity in the range of 20% to 90% by volume. A porosity below 20% by volume may result in an insufficient exposed area of the electroconductive material. A porosity above 90% by volume may result in an insufficient mechanical strength of the polymer fibers, causing a crack during deformation. The porosity can be determined by a mercury intrusion method, a gas adsorption method, or Archimedes' principle.

The pores preferably have a size in the range of 0.005 µm to 3 mm, more preferably 0.01 to 500 µm. A pore size below 0.01 µm may result in an insufficient exposed area of the electroconductive material. A pore size above 500 µm may result in an insufficient mechanical strength of the polymer fibers, causing a crack during deformation. The pore size can be determined by a mercury intrusion method, a gas adsorption method, or direct observation with a scanning electron microscope.

The electrode layers according to the present embodiment have a thickness in the range of 0.1 µm to 5 mm, a width in the range of 0.1 mm to 1 m, and a length in the range of 5 mm to 1 m. The electrolyte layer has a thickness in the range of 1 to 500 µm, a width in the range of 0.1 mm to 1 m, and a length in the range of 0.1 mm to 1 m. The electrolyte layers and the electrode layer have the same planar shape.

The electroconductive material according to the present embodiment is carbon black, carbon fiber, or carbon nanotube. Carbon black is carbon fine particles having a diameter approximately in the range of 3 to 500 nm manufactured under industrial quality control. Carbon fiber is a fibrous carbon material containing 90% or more carbon element and having the structure and characteristics of carbon as well as the characteristics of a fiber material. Carbon nanotube is a monolayer or multilayer coaxial tubular substance having a network of six-membered carbon rings. Carbon nanotube can form an electroconductive elastic layer. In order to impart electrical conductivity to the electrode layer, the proportion of the electroconductive material can be 1% by weight or more of the electrode layer.

The electrolyte layer according to the present embodiment may contain an inorganic material or an organic material as a base material. The organic material may be a polymeric material. The electrolyte layer can be formed of an organic polymer gel to hold an electrolyte.

A voltage in the range of 0.01 to 10 V can be applied to the actuator according to the present embodiment. The application of a voltage in the range of 0.01 to 10 V can result in a displacement of the actuator in the range of 1 µm to 5 m.

The electrode layers preferably have an electrical resistance of 1000 Ω·cm or less, more preferably 100 Ω·cm or less. When the electrodes have an electrical resistance of 1000 Ω·cm or less, the application of a low voltage, more specifically approximately 2 V, to the electrodes can deform the actuator by approximately 5 mm.

Figure 2A:
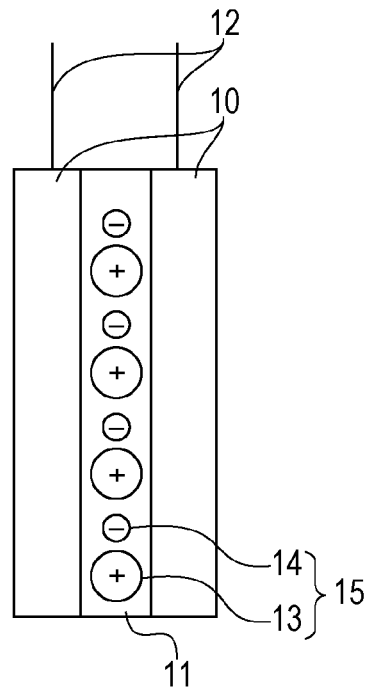
FIGS. 2A and 2B are schematic views illustrating the operation of an actuator according to one embodiment of the present invention.
Figure 2B:
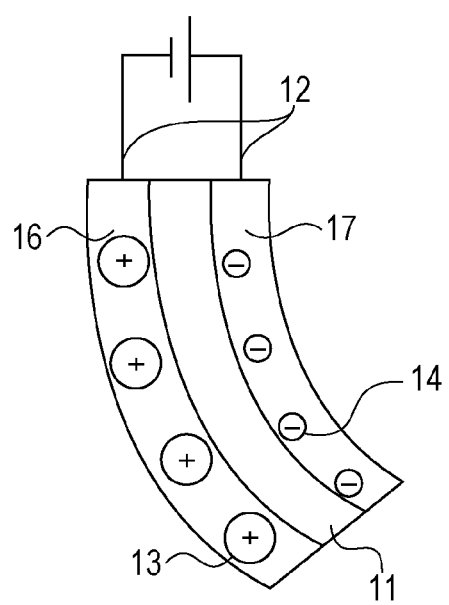

The operation of the actuator according to the present embodiment will be described below with reference to FIGS. 2A and 2B. FIG. 2A is a schematic view of an undeformed state. FIG. 2B is a schematic view of a deformed state.

An electrolyte 15 of an electrolyte layer 11 contains cations 13 and anions 14. The actuator includes electrode layers 10 and lead wires 12.

As illustrated in FIG. 2B, when operated at a direct current, one electrode layer 17 functions as a positive electrode, and the other electrode layer 16 functions as a negative electrode. The cations 13 in the electrolyte layer 11 move to the negative electrode layer 16, and the anions 14 move to the positive electrode layer 17.

In general, cations are larger than anions. Thus, the negative electrode layer 16 containing the cations 13 deforms more greatly than the positive electrode layer 17. It is believed that the steric effect of ions in the electrode layers works cooperatively with electrostatic repulsion associated with an electric double layer.

When the electrode layers in the undeformed state contain the electrolyte, the actuator can deform immediately upon the application of a voltage. The electrode layers can contain 80% by weight or less electrolyte. An electrode layer containing more than 80% by weight electrolyte may have a small mechanical strength. The term "% by weight", as used herein, refers to the proportion of the weight of electrolyte to the total weight of the electrolyte, polymer fibers, and an electroconductive material in the electrode layer.

Since the electrode layers are aggregates of polymer fibers and contain voids, and the polymer fibers are porous, ions enter deep in the electrode layers, or a large number of ions are contained in the electrode layers.

In the actuator according to the present embodiment, the electrode layers can be formed of gel containing carbon nanotube and an ionic liquid that is nonvolatile at normal temperature.

The actuator according to the present embodiment can be deformed in the air or in a vacuum.

FIG. 2B illustrates a pair of negative electrode layer 16 and positive electrode layer 17. In the absence of an electric field or in the presence of an excessively small electric field, ion diffusion can eliminate the deformation.

The pair of electrode layers 16 and 17 can alternately function as the positive electrode and the negative electrode by the application of an alternating current. The application of an alternating current can return the actuator to the undeformed state or deform the actuator in a direction opposite to the direction illustrated in FIG. 2B.

In the actuator according to the present embodiment, each of the pair of electrode layers contains porous polymer fibers among which there are voids. In an actuator according to one embodiment of the present invention, at least one of the electrode layers may contain porous polymer fibers among which there are voids.

In the actuator according to the present embodiment, the electrode layers are rectangular. In an actuator according to one embodiment of the present invention, the electrode layers may be circular, triangular, or elliptical.

The electrode layers according to the present embodiment contain polymer fibers in random orientations. Polymer fibers according to one embodiment of the present invention may be unidirectionally orientated. For example, in a rectangular actuator having lead wires for voltage supply at one end in the longitudinal direction, polymer fibers can be orientated in the longitudinal direction of electrode layers. This can reduce a difference in voltage between one end in contact with the lead wires and the opposite end in the longitudinal direction to which no lead wire is connected.

The polymer fibers may be unidirectionally oriented in a direction across the longitudinal direction. This allows the actuator to be easily deformed.

The electrode layers may contain components other than the polymer fibers and the electroconductive material provided that the components do not adversely affect the functions of the soft actuator.

Examples of a method for manufacturing polymer fibers include, but are not limited to, an electrospinning method, a composite spinning method, a polymer blend spinning method, a melt-blow spinning method, and a flash spinning method.

The electrospinning method allows various polymers to be spun into fibers and can relatively easily control the shape of fibers. Thus, nanofibers can be manufactured by the electrospinning method. The electrospinning method can be used in combination with a polymer extraction method.

Porous polymer fibers according to one embodiment of the present invention can be manufactured by any method, including the methods described above. For example, polymer fibers obtained by the method described above can be manufactured by a polymer extraction method, a solvent extraction method, a radiation etching method, a foaming method, or a drawing method.

In the polymer extraction method, at least two polymers are blended to produce polymer fibers having a microphase-separated structure, and then at least one of the polymers is extracted to form pores. More specifically, at least two polymers are blended to produce polymer fibers, for example, by the electrospinning method described above. A component constituting a discontinuous phase is then removed from the polymer composition having a microphase-separated structure by heating or solvent extraction utilizing a difference in thermal degradability and solubility in solvent to form pores. A polymer to be extracted may be any polymer having different thermal degradability and solubility in solvent from the base polymer of the polymer fibers having a microphase-separated structure and is, for example, polyamide, polystyrene, a styrene-acrylonitrile copolymer, polycarbonate, poly(butylene terephthalate), poly(ethylene terephthalate), poly(phenylene sulfide), polyvinylpyrrolidone, polysulfone, polyethersulfone, polyetheretherketone, polyamideimide, polyimide, or polyetherimide. These polymers may be used alone or in combination.

In a method for manufacturing polymer fibers, an electroconductive material can be dispersed in a polymer to produce porous polymer fibers containing the electroconductive material by the polymer extraction method.

In the solvent extraction method, polymer fibers containing a first solvent compatible with a polymer are immersed in a second solvent incompatible with the polymer. The first solvent is compatible with the second solvent. The immersion in the second solvent incompatible with the polymer causes phase separation inside the polymer fibers or on the surface of the polymer fibers. The second solvent extracts the first solvent in the polymer to form pores in the polymer fibers. The first and second solvents may be any miscible and immiscible solvents in the polymer provided that the first solvent is compatible with the second solvent.

In a method for manufacturing porous polymer fibers, for example, polymer fibers spun by the electrospinning method can be processed into porous polymer fibers by the solvent extraction method.

In the radiation etching method, a polymer is irradiated with a high-energy heavy ion beam, neutron, or laser to damage the neighborhood of the irradiated portion and is then immersed in an acid or alkaline solution to form a pore in the irradiated portion.

In the foaming method, polymer fibers containing a blowing agent are expanded by heating to form pores.

In the drawing method, a polymer is drawn and sheared to form fine fibers (a microfibril structure) and pores.

These methods may be used alone or in combination.

The polymer fibers may be formed of any polymer provided that the polymer fibers can be deformed while the actuator is deformed. The polymer fibers can be resistant to hydrolysis and stable in the atmosphere.

Specific examples of the polymer include, but are not limited to, polyolefin polymers, such as polyethylene and polypropylene; polyarylenes (aromatic polymers), such as polystyrene, polyimides, poly(p-phenylene oxide), poly(2,6-dimethylphenylene oxide), and poly(p-phenylene sulfide); polyolefins, polystyrene, polyimides, and polyarylenes (aromatic polymers) having a sulfo group ($-SO_3H$), a carboxy group ($-COOH$), a phosphate group, a sulfonium group, an ammonium group, and a pyridinium group; fluorine-containing polymers, such as polytetrafluoroethylene and poly(vinylidene fluoride); fluorine-containing polymers having a sulfo group, a carboxy group, a phosphate group, a sulfonium group, an ammonium group, and a pyridinium group, such as perfluorosulfonic acid polymers, perfluorocarboxylic acid polymers, and perfluorophosphoric acid polymers; polybutadiene compounds; polyurethane compounds, such as elastomer and gel; silicone; poly(vinyl chloride); poly(ethylene terephthalate); polyamides, such as nylon; and polyarylates.

In the polymer fibers containing an electroconductive material, the polymer functions as a binder for the electroconductive material and can prevent cracks and detachment of the electrode layer, as compared with an electrode layer only composed of the electroconductive material without the polymer.

The polymer fibers according to one embodiment of the present invention may contain an electroconductive polymer, such as polyaniline, polypyrrole, polythiophene, polyacetylene, or polyphenylene.

Examples of the polymer of the polymer fibers include a poly(vinylidene fluoride-hexafluoropropylene) copolymer [PVDF(HFP)], poly(vinylidene fluoride) (PVDF), perfluorosulfonic acid polymers, poly(2-hydroxyethyl methacrylate) (PHEMA), poly(methyl methacrylate) (PMMA), poly(ethylene oxide) (PEO), and polyacrylonitrile (PAN). These polymers can be used in the case that the electrolyte is an ionic liquid.

The polymer fibers according to one embodiment of the present invention can contain a polymer having the same type of, similar, or the same polymer structure or the same type of, similar, or the same functional group as the polymer constituting the electrolyte layer.

The polymer fibers according to one embodiment of the present invention may contain a metal oxide having a polymer structure formed by a sol-gel process. Examples of the metal oxide include, but are not limited to, manganese oxides, nickel oxides, cobalt oxides, and vanadium pentoxide.

The polymer fibers may contain one or two or more electroconductive materials according to one embodiment of the present invention.

The electroconductive material according to one embodiment the present invention can be carbon nanotube. Carbon nanotube can form an electroconductive elastic layer. Carbon nanotube together with an ionic liquid can be sheared and dispersed to produce elastic electroconductive gel. Carbon nanotube is formed of a tubular graphene sheet and is broadly divided into single-walled carbon nanotube (SWNT) and multi-walled carbon nanotube (MWNT) depending on the number of surrounding walls. There are various carbon nanotubes having different graphene sheet structures, such as chiral (helical), zigzag, and armchair. Any type of carbon nanotube may be used in one embodiment of the present invention. In general, single-walled carbon nanotube having a large aspect ratio, that is, long and narrow single-walled carbon nanotube can easily form gel. In one embodiment of the present invention, therefore, a gel composition can be produced from SWNT. One example of practicable carbon nanotube is, but not limited to, HiPco (manufactured by Carbon Nanotechnology Inc.). HiPco can be produced in large quantities from carbon monoxide.

The electroconductive material according to one embodiment of the present invention may be an electroconductive polymer. Examples of the electroconductive polymer include, but are not limited to, π-conjugated electroconductive polymers, such as polyacetylene, polyaniline, polypyrrole, polythiophene, poly(p-phenylene), poly(phenylene vinylene), and polyazulene, and derivatives of the π-conjugated electroconductive polymers. These electroconductive polymers may be used alone or in combination.

The electrode layer for use in one embodiment of the present invention can contain an electrolyte. In order to improve the dispersibility of carbon nanotube, the polymer fiber can contain carbon nanotube gel composed of carbon nanotube and an ionic liquid.

Specific examples of an electrolyte according to an embodiment of the present invention include, but are not limited to, lithium fluoride, lithium bromide, sodium bromide, magnesium chloride, copper sulfate, sodium acetate, sodium oleate, and sodium acetate. An electrolyte according to an embodiment of the present invention can be an ionic liquid.

An ionic liquid is also referred to as an ambient temperature molten salt or simply as a molten salt and is a salt in a molten state in a wide temperature range including ambient temperature (room temperature). An ionic liquid is nonvolatile at ambient temperature. Use of an ionic liquid as an ion-conducting substance according to one embodiment of the present invention allows an actuator to operate in a low-humidity air and in a vacuum.

An ionic liquid may have an electric conductivity of 0.1 $Sm^{-1}$ or more.

Examples of an ionic liquid for use in one embodiment of the present invention include ionic liquids composed of cations having the general formulae (1) to (4) and anions ($X^-$).

[Chem. 1]

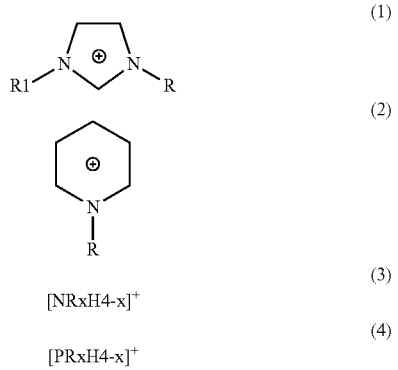

In the formulae (1) to (4), R denotes an alkyl group having 1 to 12 carbon atoms or an alkyl group having an ether bond and 3 to 12 carbon and oxygen atoms in total. In the formula (1), R1 denotes an alkyl group having 1 to 4 carbon atoms or a hydrogen atom. In the formula (1), R can be different from R1. In the formulae (3) and (4), x denotes an integer in the range of 1 to 4.

Examples of the anion ($X^-$) include, but are not limited to, a tetrafluoroboric acid anion, a hexafluorophosphoric acid anion, a bis(trifluoromethanesulfonyl)imidic acid anion, a perchloric acid anion, a tris(trifluoromethanesulfonyl)carbon acid anion, a trifluoromethanesulfonic acid anion, a dicyanamide anion, a trifluoroacetic acid anion, organic carboxylic acid anions, and halogen ions.

The electrolyte layer may be formed by any method provided that the electrolyte is held in the electrolyte layer. For example, an ionic liquid and a polymer are dissolved or dispersed in a solvent to prepare an ionic composition. The ionic composition is formed into a film by a casting method, a spin coating method, a printing method, or a spray method, followed by solvent evaporation and drying. Alternatively, a polymer can be melted and mixed with an ionic substance and then formed into a film. An extrusion process or an injection process can also be used.

A method for manufacturing an actuator is not particularly limited. For example, after an electrode layer and an electrolyte layer are manufactured by the methods described above, the electrode layer and the electrolyte layer are stacked in a desired order and are fused by hot pressing. Alternatively, an electrolyte layer can be formed by the method described above, and then an electrode layer can be formed on both faces of the electrolyte layer by the electrospinning method. These methods may be combined.

When an ionic liquid is used as an electrolyte, a voltage can be applied to an actuator in such a range that the ionic liquid is not decomposed (a potential window). For example, when the ionic liquid is 1-butyl-3-methylimidazolium tetrafluoroborate, the potential window is 4.9 V. Thus, a voltage applied to the actuator can be 4.9 V or less.

An actuator according to one embodiment of the present invention can be used as an actuator for robots in contact with human beings requiring flexibility and safety, in robot hands and manipulators, and in driving sources for various machines. An actuator according to one embodiment of the present invention can also be used in medical and welfare robots, such as surgical devices and powered exoskeletons, and micromachines.

Although the present invention will be further described in detail in the following Examples, the present invention is not limited to these Examples.

Example 1

An actuator 1 was manufactured as described below. The actuator 1 included electrode layers and an electrolyte layer disposed between the electrode layers. The electrode layers contained porous polymer fibers containing carbon nanotube.

First, in order to manufacture the electrolyte layer, an ionic composition that contained an ionic liquid and a polymer was prepared. 100 mg of a poly(vinylidene fluoride-hexafluoropropylene) copolymer (PVdF(HFP)) having the following chemical formula, 100 mg of 1-butyl-3-methylimidazolium tetrafluoroborate (BMIBF4, manufactured by Kanto Chemical Co., Inc.), and 1 mL of N,N-dimethylacetamide (DMAc, manufactured by Kishida Chemical Co., Ltd.) were mixed at 80° C. to prepare an ionic composition that contained a colorless transparent ionic liquid and a polymer.

[Math. 1]

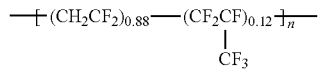

n denotes the number of constitutional repeating units. n is 230.

The ionic composition was then poured onto a substrate on which a spacer having a thickness of 80 μm was disposed. The ionic composition was leveled flush with the spacer and was dried at room temperature to form an electrolyte layer.

An electrode layer formed of polymer fibers containing carbon nanotube (CNT) was prepared by the electrospinning method. First, an electroconductive material dispersion that contained a uniformly dispersed electroconductive material CNT was prepared in the following manner. One milliliter of an organic solvent DMAc was added to 10 mg of single-walled carbon nanotube (SWNT) HiPco (HiPco is a trade name of Carbon Nanotechnology Inc.) serving as an electroconductive material and 100 mg of an ionic liquid BMIBF4. The mixture was dispersed with zirconia balls (having a particle size of 2 mm) at 200 rpm for 30 minutes in a ball mill (a planetary mill manufactured by Fritsch GmbH). A solution of 16 mg of polystyrene (PS, grade name Styron 666, manufactured by Asahi Kasei Co.) and 64 mg of nylon 6 polyamide (PA, grade name 1022B, manufactured by Ube Industries, Ltd.) in 2 mL of NMP was then added to the composition in the ball mill and was dispersed at 500 rpm for 30 minutes to prepare the electroconductive material dispersion.

A diluted solution of the electroconductive material dispersion was ejected by the electrospinning method to produce porous polymer fibers. More specifically, a tank of an electrospinning apparatus (manufactured by MECC Co., Ltd.) was filled with the electroconductive material dispersion diluted with DMAc. A voltage of 20 kV was applied to a spinneret to eject the electroconductive material dispersion to a collector. Porous polymer fibers were then produced by the polymer extraction method. More specifically, the resulting film was immersed in chloroform for 24 hours to extract PS in the polymer fibers. The film was then dried under vacuum to prepare an electrode layer formed of porous polymer fibers containing the electroconductive material. Another electrode layer was prepared in the same way.

The two electrode layers were immersed in an ionic liquid BMIBF4 overnight to prepare electrode layers containing the ionic liquid. The electrode layer, the electrolyte layer, and the electrode layer were stacked in this order and were fused with a hot press (manufactured by Tester Sangyo Co., Ltd.) at 130° C. and 0.5 kN to form a laminate. The laminate was then cut into 1 mm in width (W)×12 mm in length (L) to prepare an actuator 1.

The observation of the cross section of the actuator 1 with a scanning electron microscope S-4800 (S-4800 is a trade name of Hitachi High-Technologies Co.) showed that the electrolyte layer was disposed between the electrode layers each having a thickness of 30 μm. The observation also showed that the electrode layers were formed of polymer fibers having a diameter of 1 μm in random orientations. The observation also showed that the polymer fibers had pores having a size of 0.5 μm or less and were porous.

Example 2

An actuator 2 according to Example 2 was the same as the actuator 1 according to Example 1 except that they had different porosities.

The actuator 2 according to Example 2 was fabricated in the same way as in Example 1 except that 16 mg of PS and 64 mg of PA in the process for manufacturing polymer fibers by the electrospinning method in Example 1 were substituted by 40 mg of PS and 40 mg of PA.

The observation of the cross section of the actuator 2 with a scanning electron microscope S-4800 (S-4800 is a trade name of Hitachi High-Technologies Co.) showed that the electrolyte layer was disposed between the electrode layers each having a thickness of 30 μm. The observation also showed that the electrode layers were formed of polymer fibers having a diameter of 1 μm in random orientations. The observation also showed that the polymer fibers had pores having a size of 0.5 μm or less and were porous.

Example 3

An actuator 3 according to Example 3 was the same as the actuator 2 according to Example 2 except that their respective polymers of polymer fibers were of different types.

An electrode layer containing porous polymer fibers was prepared by the following solvent extraction method in place of the extraction of PS with chloroform after the electrospinning method in Example 1.

More specifically, 16 mg of polystyrene and 64 mg of nylon 6 polyamide in the preparation of the polymer fibers by the electrospinning method in Example 1 were substituted by 80 mg of PVdF(HFP). An electroconductive material dispersion was prepared in the same manner as Example 1 except for the conditions described above.

The electroconductive material dispersion was ejected to a collector to form porous polymer fibers by the solvent extraction method. The collector was in 50% by weight aqueous methanol. After ejection for five hours, the resulting film was dried under vacuum to prepare an electrode layer formed of porous polymer fibers containing the electroconductive material. Another electrode layer was prepared in the same way.

An electrolyte layer and a laminate were prepared in the same manner as Example 1. Thus, an actuator 3 was fabricated.

The observation of the cross section of the actuator 3 with a scanning electron microscope S-4800 (S-4800 is a trade name of Hitachi High-Technologies Co.) showed that the electrolyte layer was disposed between the electrode layers each having a thickness of 30 μm. The observation also showed that the electrode layers were formed of polymer fibers having a diameter of 5 μm in random orientations. The observation also showed that the polymer fibers had pores having a size of 0.5 μm or less and were porous.

Example 4

An actuator 4 according to Example 4 was the same as the actuator 3 according to Example 3 except that they had different porosities.

The actuator 4 according to Example 4 was fabricated under the same conditions as Example 3 except that 50% by weight aqueous methanol in the preparation of polymer fibers by the electrospinning method was substituted by 10% by weight aqueous methanol.

The observation of the cross section of the actuator 4 with a scanning electron microscope S-4800 (S-4800 is a trade name of Hitachi High-Technologies Co.) showed that the electrolyte layer was disposed between the electrode layers each having a thickness of 30 μm. The observation also showed that the electrode layers were formed of polymer fibers having a diameter of 5 μm in random orientations. The observation also showed that the polymer fibers had pores having a size of 0.5 μm or less and were porous.

Example 5

An actuator 5 according to Example 5 was the same as the actuator 2 according to Example 2 except that they contained different electroconductive materials.

More specifically, the actuator 5 according to Example 5 was fabricated under the same conditions as Example 2 except that 10 mg of carbon nanotube was substituted by 10 mg of carbon fiber VGCF (registered trademark) (manufactured by Showa Denko K.K.).

The observation of the cross section of the actuator 5 with a scanning electron microscope S-4800 (S-4800 is a trade name of Hitachi High-Technologies Co.) showed that the electrolyte layer was disposed between the electrode layers each having a thickness of 30 μm. The observation also showed that the electrode layers were formed of polymer fibers having a diameter of 1 μm in random orientations. The observation also showed that the polymer fibers had pores having a size of 0.5 μm or less and were porous.

Example 6

An actuator 6 according to Example 6 was the same as the actuator 2 according to Example 2 except that they contained different electroconductive materials.

More specifically, the actuator 6 according to Example 6 was fabricated under the same conditions as Example 2 except that 10 mg of carbon nanotube was substituted by 10 mg of carbon black DENKA BLACK (registered trademark) (manufactured by Denki Kagaku Kogyo K.K.).

The observation of the cross section of the actuator 6 with a scanning electron microscope S-4800 (S-4800 is a trade name of Hitachi High-Technologies Co.) showed that the electrolyte layer was disposed between the electrode layers each having a thickness of 30 μm. The observation also showed that the electrode layers were formed of polymer fibers having a diameter of 1 μm in random orientations. The observation also showed that the polymer fibers had pores having a size of 0.5 μm or less and were porous.

Comparative Example 1

An actuator 7 according to Comparative Example 1 was the same as the actuator 1 according to Example 1 except that the porosity was 0% by volume and the polymer was not fibrous.

An electroconductive material dispersion was prepared in the same manner as Example 1. A laminate that included an ion-conducting layer between two electroconductive layers was fabricated as described below. First, the electroconductive material dispersion was poured onto a substrate on which a spacer having a thickness of 50 μm was disposed. The electroconductive material dispersion was leveled flush with the spacer and was dried at room temperature to form a first electroconductive layer. Another spacer having a thickness of 80 μm was placed on the electroconductive layer. The PA/BMIBF4/PA ionic composition prepared in Example 1 was poured and leveled flush with the spacer and was dried at room temperature to form an ion-conducting layer. Still another spacer having a thickness of 80 μm was placed on the spacer. The electroconductive material dispersion was poured and leveled flush with the spacer, was dried at room temperature, and was dried overnight under vacuum. Thus, an actuator 7 was fabricated.

The observation of the cross section of the actuator 7 with a scanning electron microscope S-4800 (S-4800 is a trade name of Hitachi High-Technologies Co.) showed that the electrolyte layer was disposed between the electrode layers each having a thickness of 30 μm. The observation of the cross section of the actuator 7 also showed that the electrode layer was formed of a uniform film containing the polymer, the carbon nanotube, and the ionic liquid.

Comparative Example 2

An actuator 8 according to Comparative Example 2 was the same as the actuator 3 according to Example 3 except that the porosity was 0% by volume and the polymer was not fibrous.

An electroconductive material dispersion was prepared in the same manner as Example 3. The actuator 8 was fabricated in the same manner as Comparative Example 1.

The observation of the cross section of the actuator 8 with a scanning electron microscope S-4800 (S-4800 is a trade name of Hitachi High-Technologies Co.) showed that the electrolyte layer was disposed between the electrode layers each having a thickness of 30 μm. The observation of the cross section of the actuator 8 also showed that the electrode layer was formed of a uniform film containing the polymer, the carbon nanotube, and the ionic liquid.

Comparative Example 3

An actuator 9 according to Comparative Example 3 was the same as the actuator 3 according to Example 3 except that they had different porosities.

The actuator 9 according to Comparative Example 3 was fabricated under the same conditions as Example 3 except that 50% by weight aqueous methanol in the preparation of polymer fibers by the electrospinning method was substituted by water.

The observation of the cross section of the actuator 9 with a scanning electron microscope S-4800 (S-4800 is a trade name of Hitachi High-Technologies Co.) showed that the electrolyte layer was disposed between the electrode layers each having a thickness of 30 μm. The observation also showed that the electrode layers were formed of polymer fibers having a diameter of 5 μm in random orientations. The observation also showed that the polymer fibers had pores having a size of 0.5 μm or less and were porous.

Measurement of Porosity

The porosities of the electrode layers according to Examples 1 to 6 and Comparative Examples 1 to 3 were measured with a porosimeter PoreSizer 9320 (PoreSizer 9320 is a trade name of Micromeritics Instrument Co.) by a mercury intrusion method. Table 1 shows the results.

Measurement of Displacement

The displacement of an actuator was measured with a laser displacement meter. An actuator 1 mm in width (W)×12 mm in length (L) was clamped at a portion 2 mm away from an end (a fixed end) with a holder having an electrode. A voltage of 2.5 V was applied to the actuator to bend the actuator in the air (operation in the air). The displacement of the actuator at a position 8 mm away from the fixed end was measured with the laser displacement meter to calculate the rate of increase in displacement. More specifically, the rate of increase in displacement was calculated by the following formula (5) for the actuators 1, 2, 5, and 6 in which the polymer of the electrode layers was PA and the following formula (6) for the actuators 3, 4, 5, and 9 in which the polymer of the electrode layers was PVDF(HFP).

[Math. 2]

$$\text{Rate of increase in displacement (\%)} = \frac{(\text{Displacement in Example}) - (\text{Displacement in Comparative Example 1})}{\text{Displacement in Comparative Example 1}} \times 100 \quad (5)$$

[Math. 3]

$$\text{Rate of increase in displacement (\%)} = \frac{(\text{Displacement in Example}) - (\text{Displacement in Comparative Example 2})}{\text{Displacement in Comparative Example 2}} \times 100 \quad (6)$$

Thus, the actuators 1, 2, 5, and 6 were evaluated in terms of the rate of increase in displacement relative to the actuator 7, and the actuators 3, 4, 5, and 9 were evaluated in terms of the rate of increase in displacement relative to the actuator 8. Table 1 shows the results.

by volume and the polymer was not fibrous. The actuators 5 and 6 exhibited a rate of increase in displacement of 125% and 100%, respectively.

Evaluation of Durability

While one end of an actuator was fixed, a voltage of 2.5 V was applied to the actuator to bend the actuator 5000 times. After that, the displacement was measured. The durability was evaluated using the formulae (5) and (6) in the same manner as Measurement of Displacement. Table 1 shows the durability of the actuators 1 to 9.

The actuators 1 to 6, in which the electrode layers had a porosity in the range of 0% to 85% by volume, showed no change in displacement after bending 5000 times and exhibited rates of increase in displacement of 100%, 175%, 175%, 190%, 125%, and 100% after bending 5000 times. In contrast, in the actuator 9 having a porosity of 91% by volume, the rate of increase in displacement was reduced to 50% after bending 5000 times.

The surfaces of the electrode layers of the actuators 1 to 8 after bending 5000 times were observed with a scanning

TABLE 1

| | Comparative Example 1 | Example 1 | Example 2 | Comparative Example 2 | Example 3 | Example 4 | Comparative Example 3 | Example 5 | Example 6 |
|---|---|---|---|---|---|---|---|---|---|
| Actuator | Actuator 7 | Actuator 1 | Actuator 2 | Actuator 8 | Actuator 3 | Actuator 4 | Actuator 9 | Actuator 5 | Actuator 6 |
| Polymer of electrode layer | PA | PA | PA | PVDF(HPF) | PVDF(HPF) | PVDF(HPF) | PVDF(HPF) | PA | PA |
| Electroconductive material | CNT | CNT | CNT | CNT | CNT | CNT | CNT | VGCF | Carbon black |
| Thickness of electroconductive layer (μm) | 30 | 30 | 30 | 30 | 30 | 30 | 30 | 30 | 30 |
| Width of polymer fiber (μm) | — | 1 | 1 | — | 5 | 5 | 5 | 1 | 1 |
| Porosity (vol %) | 0 | 20 | 50 | 0 | 50 | 85 | 91 | 50 | 50 |
| Displacement (mm) | 2.0 | 4.0 | 5.5 | 2.0 | 5.5 | 5.8 | 5.9 | 4.5 | 4.0 |
| Rate of increase in displacement (%) | 0 | 100 | 175 | 0 | 175 | 190 | 195 | 125 | 100 |
| Displacement after bending 5000 times (mm) | 2.0 | 4.0 | 5.5 | 2.0 | 5.5 | 5.8 | 3.0 | 4.5 | 4.0 |
| Rate of increase in displacement after bending 5000 times (%) | 0 | 100 | 175 | 0 | 175 | 190 | 50 | 125 | 100 |

The actuators 1 and 2, in which the polymer of the electrode layers was PA and the electroconductive material was SWNT, had a porosity of 20% and 50% by volume, respectively. The displacements of the actuators 1 and 2 were larger than the displacement of the actuator 7, in which the porosity was 0% by volume and the polymer was not fibrous. Thus, the actuators 1 and 2 exhibited a rate of increase in displacement of 100% and 175%, respectively.

The actuators 3, 4, and 9, in which the polymer of the electrode layers was PVDF(HFP) and the electroconductive material was SWNT, had a porosity of 50%, 85%, and 90% by volume, respectively. The displacements of the actuators 3, 4, and 9 were larger than the displacement of the actuator 8, in which the porosity was 0% by volume and the polymer was not fibrous. The actuators 3, 4, and 9 exhibited a rate of increase in displacement of 175%, 190%, and 195%, respectively. The actuators 5 and 6, in which the electroconductive materials of the electrode layers were carbon fiber and carbon black, respectively, had a porosity of 50% by volume. The displacements of the actuators 5 and 6 were larger than the displacement of the actuator 7, in which the porosity was 0% electron microscope S-4800 (S-4800 is a trade name of Hitachi High-Technologies Co.). The actuators 1 to 7 had no crack, whereas the actuator 9 having a porosity of 91% by volume had a crack.

These embodiments and examples demonstrate that the present invention can provide an actuator that can achieve large displacement. More specifically, a large amount of electrolyte moving from an electrolyte layer to an electrode layer is incorporated into a fibrous electrode. Since the fibers are porous, a larger amount of electrolyte can be stored. This can greatly alter the shape of the electrode layer.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-278961, filed Dec. 8, 2009, which is hereby incorporated by reference herein in its entirety.

The invention claimed is:

1. An actuator comprising:
a pair of electrode layers; and
an electrolyte layer between the pair of electrode layers, the electrolyte layer containing an electrolyte,
wherein the application of a voltage to the pair of electrode layers deforms the actuator, at least one of the pair of electrode layers contains polymer fibers so as to form voids among the polymer fibers, and the polymer fibers contain an electroconductive material and are porous.

2. The actuator according to claim 1, wherein the electroconductive material is at least one of carbon black, carbon fiber, and carbon nanotube.

3. The actuator according to claim 1, wherein the electrolyte is an ionic liquid.

4. The actuator according to claim 1, wherein the polymer fibers in random orientations.

5. The actuator according to claim 1, wherein the polymer fibers unidirectionally orientated.

6. The actuator according to claim 1, wherein the electroconductive material is exposed on the surface of the polymer fibers.

7. The actuator according to claim 1, wherein the polymer fibers having a diameter ranges from 0.05 to 50 μm, and the fiber length is at least 10 times the fiber diameter.

8. The actuator according to claim 1, wherein the pores have a size in the range of 0.01 to 500 μm.

* * * * *